(12) United States Patent
Saito et al.

(10) Patent No.: US 12,041,394 B2
(45) Date of Patent: Jul. 16, 2024

(54) IMAGING SYSTEM

(71) Applicant: Apple Inc., Cupertino, CA (US)

(72) Inventors: Kenichi Saito, Cupertino, CA (US); Yoshikazu Shinohara, Cupertino, CA (US); Pierre-Jean Parodi-Keravec, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/182,301

(22) Filed: Mar. 10, 2023

(65) Prior Publication Data

US 2023/0209028 A1    Jun. 29, 2023

Related U.S. Application Data

(62) Division of application No. 16/221,302, filed on Dec. 14, 2018, now Pat. No. 11,606,539.

(60) Provisional application No. 62/609,294, filed on Dec. 21, 2017.

(51) Int. Cl.
| | |
|---|---|
| *G02B 3/10* | (2006.01) |
| *G02B 3/14* | (2006.01) |
| *G02B 17/00* | (2006.01) |
| *G02B 21/36* | (2006.01) |
| *G03B 21/14* | (2006.01) |
| *H04N 9/31* | (2006.01) |
| *G02B 21/00* | (2006.01) |

(52) U.S. Cl.
CPC .......... *H04N 9/3185* (2013.01); *G02B 21/36* (2013.01); *G03B 21/147* (2013.01); *H04N 9/3194* (2013.01)

(58) Field of Classification Search
CPC . G02B 3/10; G02B 3/14; G02B 17/00; G02B 23/00; G02B 21/36; G02B 21/00; G02B 3/00
USPC ....... 348/63, 61, 65, 68, 79; 396/8, 7, 6, 20, 396/60, 65
See application file for complete search history.

(56) References Cited

U.S. PATENT DOCUMENTS

| | | | |
|---|---|---|---|
| 3,576,358 A * | 4/1971 | Hayamizu | G02B 15/1421 385/119 |
| 4,269,485 A | 5/1981 | Yamashita et al. | |
| 5,305,045 A | 4/1994 | Terada | |
| 5,642,223 A | 6/1997 | Hasushita et al. | |
| 6,243,216 B1 | 6/2001 | Yoo et al. | |
| 7,880,797 B2 | 2/2011 | Nanjo et al. | |
| 11,606,539 B1 | 3/2023 | Saito et al. | |

FOREIGN PATENT DOCUMENTS

JP   3639574   4/2005

* cited by examiner

*Primary Examiner* — Daquan Zhao
(74) *Attorney, Agent, or Firm* — Robert C. Kowert; Kowert, Hood, Munyon, Rankin & Goetzel, P.C

(57) ABSTRACT

An imaging system including a front aperture, two or more refractive lens elements mounted in a lens barrel, and a photosensor. One or more of the components of the imaging system (e.g., the aperture, lenses, lens groups, and/or photosensor) are tilted with respect to each other and/or with respect to a center (or mechanical) axis of the imaging system to compensate for effects including but not limited to keystone distortion, resolution non-uniformity, and gradient blur that result from tilt of an object in the field of view of the camera with respect to the center axis of the camera.

20 Claims, 12 Drawing Sheets

Receive light from a tilted object plane at an aperture of a camera; the aperture is tilted to increase the f-number for light received from a closer (e.g., bottom) portion of the object plane and decrease the f-number for light received from a farther (e.g., top) portion of the object plane, thus increasing the MTF at the farther (e.g., top) portion of the object plane.
1900

Light from the object plane that passes through the aperture is refracted by a lens system; one or more lenses or lens groups of the lens system are tilted to increase local EFL and magnification for the farther (e.g., top) portion of the object plane and to decrease local EFL and magnification for the closer (e.g., bottom) portion of the object plane.
1910

Light refracted by the lens system forms an image at an image plane proximate to the surface of a photosensor; the photosensor is tilted to compensate for tilt of the image plane.
1920

An image is captured by the photosensor.
1930

*FIG. 9*

IMAGING SYSTEM

PRIORITY INFORMATION

This application is a divisional of U.S. patent application Ser. No. 16/221,302, filed Dec. 14, 2018, which claims benefit of priority of U.S. Provisional Application Ser. No. 62/609,294, filed Dec. 21, 2017, which are hereby incorporated by reference herein in their entirety.

BACKGROUND

Technical Field

This disclosure relates generally to camera or imaging systems.

Description of the Related Art

The advent of digital imaging systems such as digital video and still cameras has led to many real-world applications in which a camera is mounted in a fixed position to capture images or video of a field of view in front of the camera. However, in many cases in such applications, a surface of an object in the field of view of the camera may not be perpendicular with respect to the optical axis of the camera. An image of the object captured by the camera will thus exhibit "keystone" distortion due to field angle dependence of the magnification. For example, an end (e.g., the top) of a rectangular object that is farther from the camera will appear smaller than an end of the object (e.g., the bottom) that is closer to the camera. Image resolution strongly depends on the object height; the resolution of the object at the end that is farther from the camera is lower than the resolution of the object at the end that is nearer to the camera. The tilt of the object with respect to the camera may also result in gradient blur; for example, if one end of the object is in focus, the other end of the object may be blurred because of the differences in distances from the camera to the two ends of the object. In some applications of digital imaging such as position sensing or range finding systems, these effects may significantly degrade the accuracy of the system, especially in cases where the camera has a macro lens and in which there is a steep angle between the surface of the object and the camera.

SUMMARY OF EMBODIMENTS

Embodiments of the present disclosure may provide an imaging system with a camera including a front aperture, two or more refractive lens elements mounted in a lens barrel, and a photosensor. The camera may be a still camera or a video camera. The photosensor may be a visible light sensor that captures light within a range of the visible spectrum or an infrared (IR) or near-infrared (NIR) sensor. In some embodiments, the camera may be mounted or otherwise attached or integrated in a fixed position at a location on an object or surface to capture images of objects in front of the camera (i.e., within the camera's field of view). The object or surface on which the camera is fixed may itself be fixed (e.g., a building or wall), or alternatively may be mobile (e.g., a vehicle). The lens barrel may be symmetrical, or may have an arbitrary shape.

A surface of an object in the field of view of the camera may not be perpendicular with respect to the optical axis of the camera. In other words, one end of the object (e.g., the bottom) may be closer to the camera than the other end of the object (e.g., the bottom). An image of the object captured by the camera may thus exhibit keystone distortion, resolution non-uniformity, and/or gradient blur.

In embodiments of the imaging system, to compensate for these effects, one or more of the components of the imaging system may be tilted with respect to each other and/or with respect to a center (or mechanical) axis of the imaging system. The center axis of the imaging system is an imaginary line that extends from the center of the aperture stop to the center of the photosensor. The optical axis of the imaging system is an imaginary line that defines the path along which light propagates through the imaging system, up to first approximation. In some embodiments, the optical axis of the imaging system may be coincident with the center axis of the imaging system. However, in some embodiments, since one or more of the components of the imaging system (e.g., one or more of the lenses or lens groups) may be tilted with respect to the center axis of the imaging system, the optical axis of the imaging system may not be coincident with the center axis of the imaging system.

In some embodiments, the photosensor may be tilted with respect to the center axis of the camera (and thus with respect to the lens system and aperture) to compensate for tilt of the image plane and thus correct for gradient blur. Without the tilt of the sensor, if one end of an object is in focus, the other end of the object may be blurred because of the differences in distances from the camera to the two ends of the object.

In some embodiments, the aperture may be enlarged and tilted with respect to the center axis of the camera (and thus with respect to the lens system and photosensor). Enlarging the aperture decreases the f-number for the camera, and tilting the aperture increases the f-number for light received from a closer (e.g., bottom) end of the object plane and decreases the f-number for light received from a farther (e.g., top) end of the object plane. This helps in satisfying modulation transfer function (MTF) requirements for the farther end of the object plane while also providing sufficient depth of field (DoF) for the closer end of the object plane.

In some embodiments, one or more lenses or lens groups in the lens system may be tilted with respect to the center axis of the camera (and thus with respect to the aperture, photosensor, and other lenses or lens groups) to increase local effective focal length (EFL) and magnification at the farther (e.g., top) end of the object plane and to decrease local EFL and magnification at the closer (e.g., bottom) end of the object plane. Note that tilting one lens or lens group creates an asymmetric air gap between that lens or lens group and another lens or lens group. Increasing local EFL and magnification at the farther end of the object plane increases pixel density at the end of the image corresponding to the farther end of the object plane and helps compensate for the keystone effect. Decreasing local EFL and magnification at the closer end of the object plane increases the f-number for light received from the closer end of the object plane and thus widens DoF at the closer end of the object plane. In some embodiments, instead of or in addition to tilting a lens or lens group, one or more of the lenses may be formed in a radially asymmetric shape, or one or more of the lenses or lens groups may be decentered, to provide a similar effect.

In some embodiments, the imaging system may include "wedge" optics, an optical element located in front of the aperture, between the camera and the object plane, which affects light received from the object plane that passes through the wedge optics to the aperture. The wedge optics may affect light received from the closer (e.g., bottom) end of the object plane differently than light received from the farther (e.g., top) end of the object plane. The wedge optics may, but does not necessarily, help to correct for one or more of keystone distortion, resolution non-uniformity, and/or gradient blur. In some embodiments, the wedge optics may ease constraints on the other components of the imaging system, for example by lessening the degree of tilt needed at one or more of the elements.

In some embodiments, the camera may include an infrared (IR) filter to reduce or eliminate interference of environmental noise on the photosensor. The IR filter may, for example, be located between the lens stack and the photosensor. In some embodiments, the camera is a fixed-focus camera. However, in some embodiments, the camera may include autofocus technology.

BRIEF DESCRIPTION OF THE DRAWINGS

FIG. 9 is a flowchart of a method for capturing images using a camera as illustrated in any of FIG. 2A, 4A, 5A, 6A, 7, or 8, according to some embodiments.

Figure 1A:
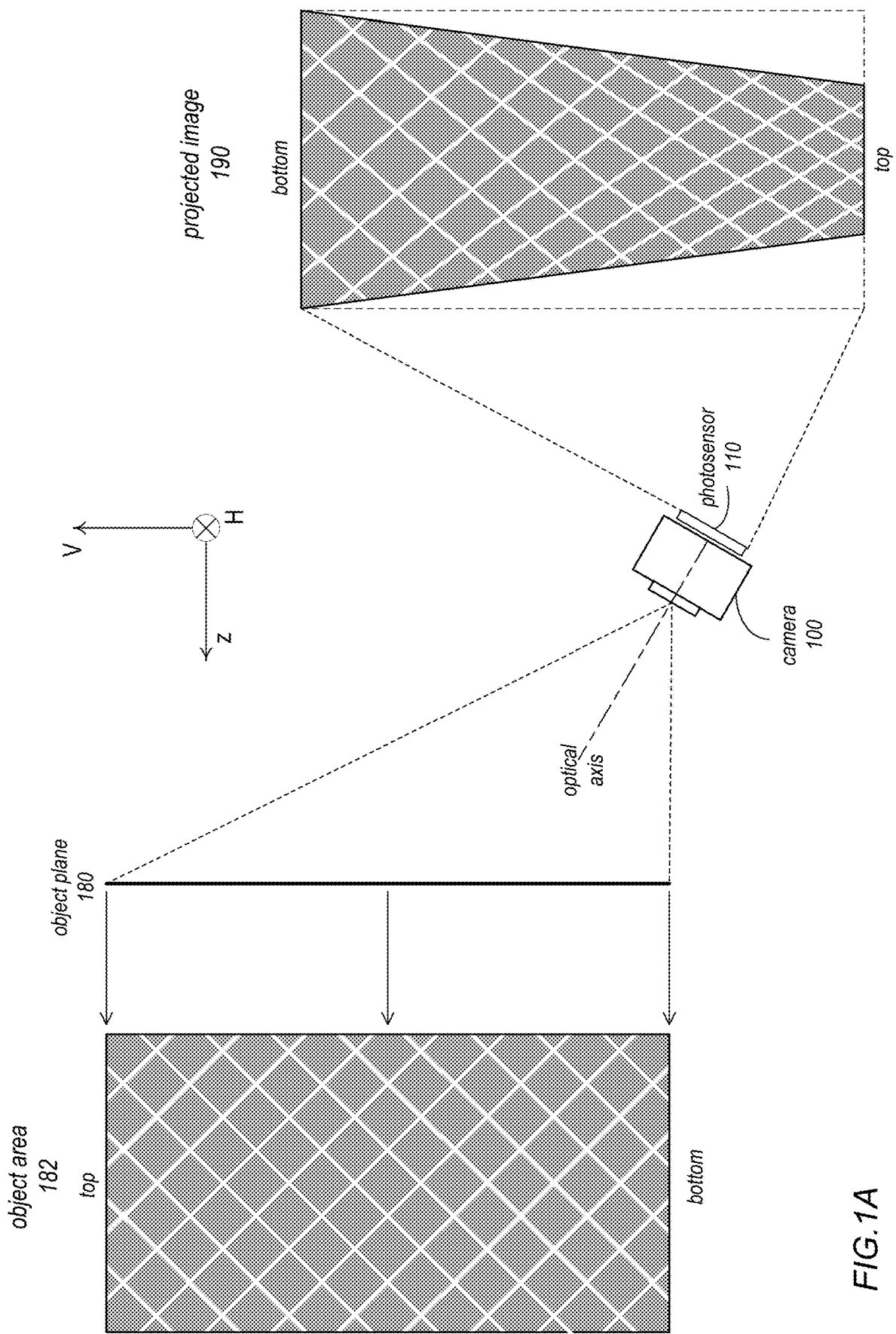
FIG. 1A illustrates an imaging system including a camera for capturing images of an object plane that is tilted with respect to the optical axis of the camera, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of an imaging system or camera including a front aperture, two or more refractive lens elements mounted in a lens barrel, and a photosensor in which one or more of the components of the imaging system (e.g., the aperture, lenses, lens groups, and/or photosensor) are tilted with respect to each other and/or with respect to a center (or mechanical) axis of the imaging system to compensate for effects including but not limited to keystone distortion, resolution non-uniformity, and gradient blur that result from tilt of an object in the field of view of the camera with respect to the center axis of the camera. Embodiments may compensate for these effects through one or more of:

rotating or tilting the photosensor of the camera so that the projected image is substantially focused at all object heights (e.g., at the farther end (e.g., top) and nearer end (e.g., bottom) of the object being imaged);

enlarging and tilting the aperture of the camera to increase the modulation transfer function (MTF) at the farther end (e.g., top) of the object being imaged; and modifying the lens system (e.g., by tilting or decentering one or more lenses or lens groups) to increase local effective focal length (EFL) and magnification at the farther (e.g., top) end of the object, increase pixel density at the end of the image corresponding to the farther end of the object, decrease local EFL and magnification at the closer (e.g., bottom) end of the object, and increase the depth of field (DoF) at the nearer end (e.g., bottom) of the object being imaged.

FIG. 1A illustrates an imaging system including a camera for capturing images of an object plane that is tilted with respect to the optical axis of the camera, according to some embodiments. A camera 100 with photosensor 110 may be fixed in a location on an object or surface to capture images of objects in front of the camera (i.e., within the camera's field of view). An object or surface on which the camera 100 is fixed may itself be fixed, or alternatively may be mobile. A surface of an object in the field of view of the camera 100 may not be perpendicular with respect to the optical axis of the camera 100. In other words, one end of the object (e.g., the bottom) may be closer to the camera 100 than the other end of the object (e.g., the bottom). By way of example, a rectangular object (shown by object area 182) is used; the object area 182 is a surface (shown as object plane 180) that faces the camera 100. The object plane 180 is tilted with respect to the camera 100, with the bottom of the object plane 180 being closer to the camera 100 than the top of the object plane 180. An image 190 of the object plane 180 captured at the photosensor 110 of the camera 100 may thus exhibit one or more of keystone distortion, resolution non-uniformity, and/or gradient blur.

Note that "top" and "bottom" are used herein for simplicity; the ends of the object could be reversed, with the top being closer to the camera 100 than the bottom, or the ends of the object with different distances to the camera 100 could be left and right sides or ends. Further note that a rectangular object with a flat surface (object plane 180) is also used for simplicity; the object could be of any arbitrary shape, and the surface facing the camera 100 is not necessarily flat as shown in these examples.

Figure 1B:
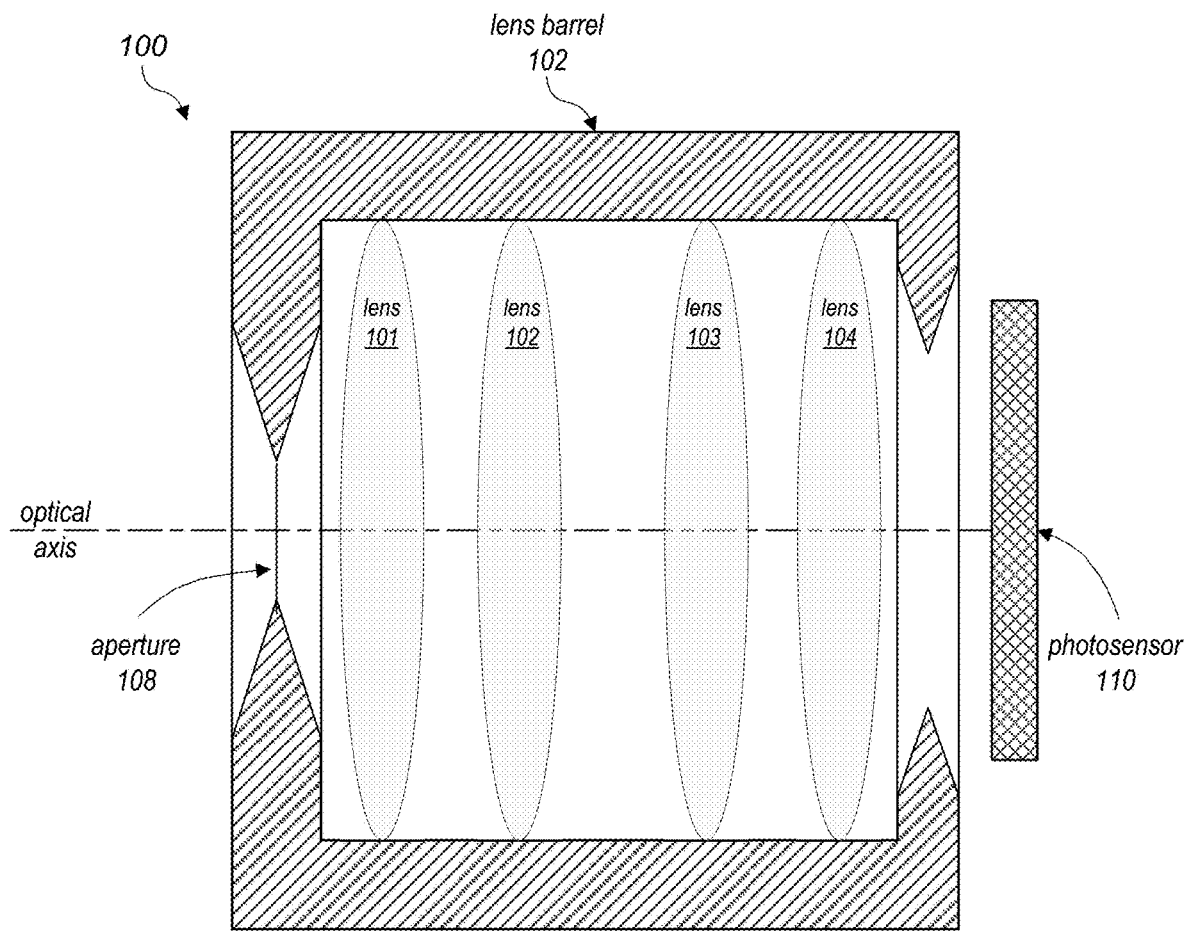
FIG. 1B illustrates an example camera, according to some embodiments.

FIG. 1B illustrates an example camera, according to some embodiments. The camera 100 may include a front aperture 108, two or more refractive lens elements mounted in a lens barrel 102, and a photosensor 110. The camera 100 may be a still camera or a video camera. The photosensor 110 may be a visible light sensor that captures light within a range of the visible spectrum or an infrared (IR) or near-infrared (NIR) sensor. This example shows four lens elements 101 through 104; however, a camera 100 may include fewer or more lens elements. In some embodiments, the lens elements may be arranged in two or more lens groups, for example a front lens group including lenses 101 and 102, and a rear lens group including lenses 103 and 104. The shapes and sizes of the lenses 101 through 104 are used for simplicity; one or more of the lenses may be of different shapes (e.g., biconvex, biconcave, positive meniscus, negative meniscus aspheric on one or both surfaces, etc.), and various ones of the lenses may have different refractive powers or other different optical characteristics (e.g., may be composed of materials with different Abbe numbers). One or more of the lenses may have positive refractive power, and one or more others of the lenses may have negative refractive power. The lenses may be round, or may be of other geometric shapes (e.g., square).

In a camera 100 as shown in FIG. 1B, the aperture 108, lens elements, and photosensor 110 are typically arranged along a center axis of the camera that is coincident with the optical axis of the camera. The center axis of the camera 100 is an imaginary line that extends from the center of the aperture stop and to the center of the photosensor 110. The optical axis of the camera 100 is an imaginary line that defines the path along which light propagates through the camera 100, up to first approximation. The long (x and y) axes of the aperture 108, lens elements, and photosensor 110 are typically perpendicular to the optical (z) axis. In addition, typically, the aperture 108 and lens elements are radially symmetric around the optical axis, with the optical axis passing through the center of the aperture 108 and the lens elements.

Figure 1C:
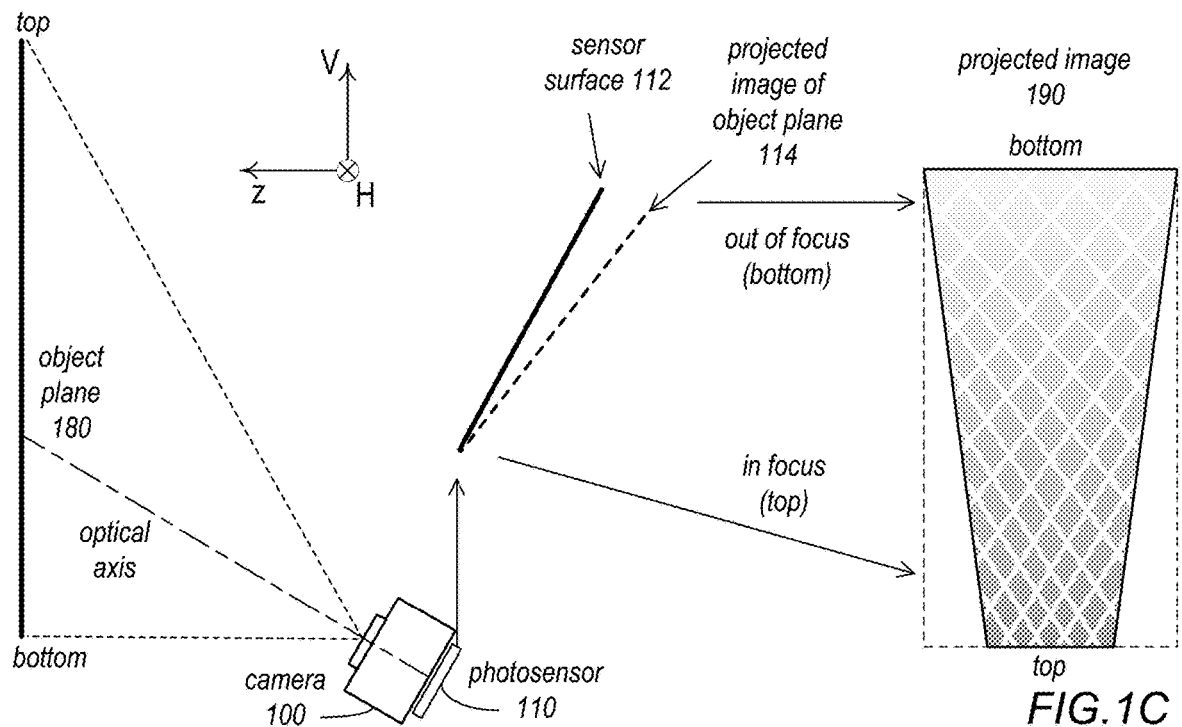
FIG. 1C illustrates effects on a projected image caused by tilt of the object plane with respect to the optical axis of the camera, according to some embodiments.

FIG. 1C illustrates effects on a projected image caused by tilt of the object plane with respect to the optical axis of the camera 100, according to some embodiments. Since object plane 180 is tilted with respect to the optical axis of the camera 100, an image 190 of the object plane 180 captured by the camera 100 will exhibit "keystone" distortion due to field angle dependence of the magnification. For example, an end (e.g., the top) of object plane 180 that is farther from the camera 100 will appear smaller than an end of the object plane 180 (e.g., the bottom) that is closer to the camera 100. Image resolution strongly depends on the object height; the resolution of the object at the end that is farther from the camera 100 is lower than the resolution of the object at the end that is nearer to the camera 100. In addition, gradient blur may result from the differences in distances from the camera 100 to the two ends of the object plane 180; the projected image 114 of the object plane 180 is not coincident with the sensor surface 112, and thus one end of the object (e.g., the top) is in focus, and the other end of the object (e.g., the bottom) is out of focus and blurred.

In embodiments of an imaging system as described herein in reference to FIGS. 2A through 9, to compensate for these effects, one or more of the components of a camera may be tilted with respect to each other and/or with respect to the center axis of the camera. In some embodiments, the optical axis of the imaging system may be coincident with the center axis of the imaging system. However, in some embodiments, since one or more of the components of the imaging system (e.g., one or more of the lenses or lens groups) may be tilted with respect to the center axis of the imaging system, the optical axis of the imaging system may not be coincident with the center axis of the imaging system.

Figure 2A:
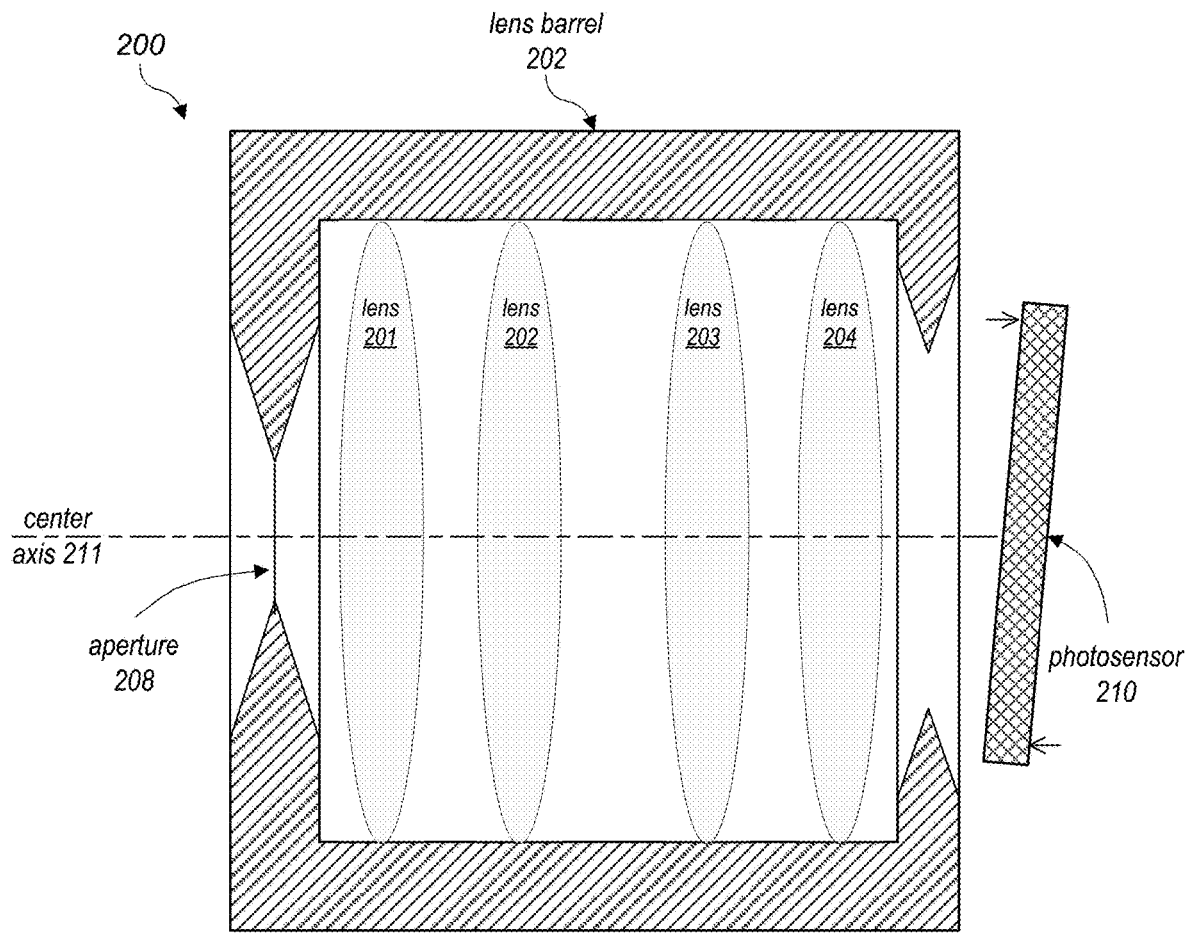
FIG. 2A illustrates tilting the photosensor of an example camera, according to some embodiments.
Figure 2B:
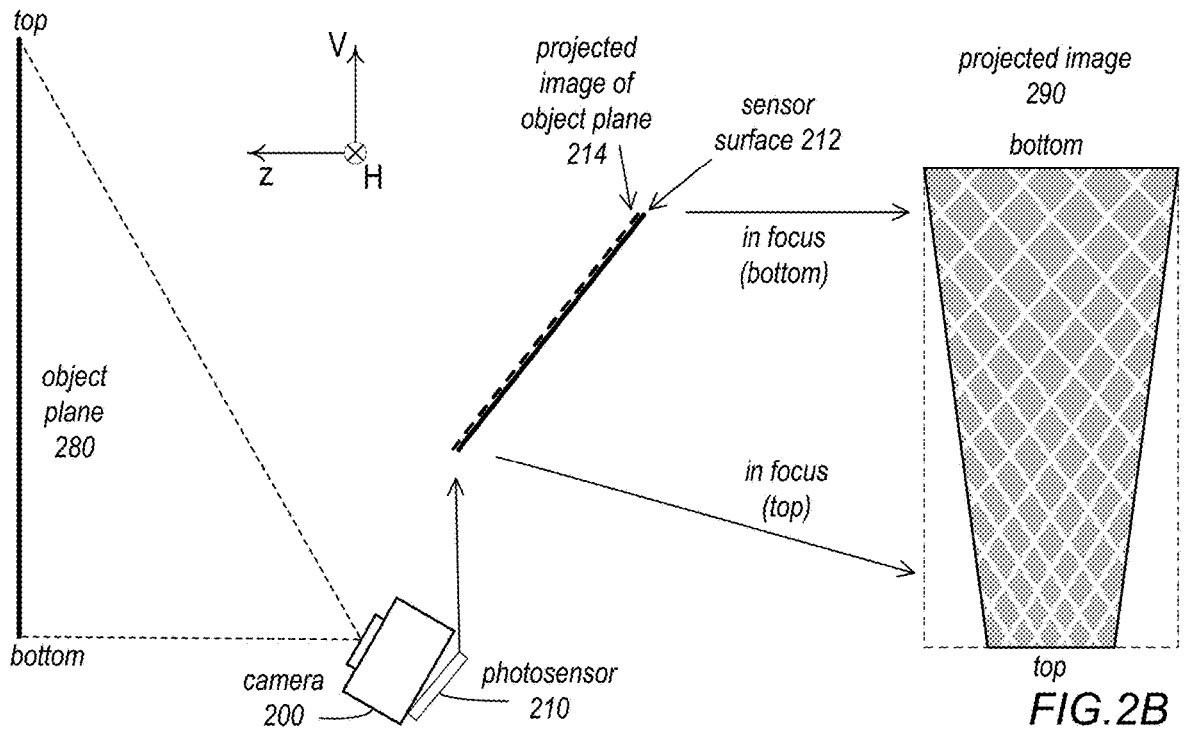
FIG. 2B illustrates effects on the projected image caused by tilting the photosensor, according to some embodiments.

In some embodiments as illustrated in FIGS. 2A and 2B, the photosensor may be tilted with respect to the center axis of the camera (and thus with respect to the lens system and aperture) to compensate for tilt of the image plane and thus correct for gradient blur. Without the tilt of the sensor, if one end of an object is in focus, the other end of the object may be blurred because of the differences in distances from the camera to the two ends of the object.

FIG. 2A illustrates tilting the photosensor of an example camera, according to some embodiments. The camera 200 may include a front aperture 208, two or more refractive lens elements mounted in a lens barrel 202, and a photosensor 210. The camera 200 may be a still camera or a video camera. The photosensor 210 may be a visible light sensor that captures light within a range of the visible spectrum or an infrared (IR) or near-infrared (NIR) sensor. As shown in this example, the photosensor 210 may be tilted with respect to the center axis 211 of the camera. This example shows four lens elements 201 through 204; however, a camera 200 may include fewer or more lens elements. In some embodiments, the lens elements may be arranged in two or more lens groups, for example a front lens group including lenses 201 and 202, and a rear lens group including lenses 203 and 204. The shapes and sizes of the lenses 201 through 204 are used for simplicity; one or more of the lenses may be of different shapes (e.g., biconvex, biconcave, positive meniscus, negative meniscus aspheric on one or both surfaces, etc.), and various ones of the lenses may have different refractive powers or other different optical characteristics (e.g., may be composed of materials with different Abbe numbers). One or more of the lenses may have positive refractive power, and one or more others of the lenses may have negative refractive power. The lenses may be round, or may be of other geometric shapes (e.g., square).

The camera 200 may, for example, be fixed in a location on an object or surface to capture images of objects in front of the camera 200 (i.e., within the camera's field of view). An object or surface on which the camera 200 is fixed may itself be fixed, or alternatively may be mobile. A surface of an object in the field of view of the camera 200 may not be perpendicular with respect to the optical axis of the camera 200. In other words, one end of the object (e.g., the bottom) may be closer to the camera 200 than the other end of the object (e.g., the bottom).

FIG. 2B illustrates effects on the projected image caused by tilting the photosensor, according to some embodiments. A rectangular object (shown as object plane 280) is used by way of example. The object plane 280 is tilted with respect to the camera 200, with the bottom of the object plane 280 being closer to the camera 200 than the top of the object plane 280. The photosensor 210 is tilted with respect to the center axis 211 of the camera 200 (and thus with respect to the lenses 201-204 and aperture 208) to compensate for tilt of the image plane 214 and thus correct for gradient blur. By tilting the sensor 210, both ends of the object may now be substantially in focus.

Figure 3:
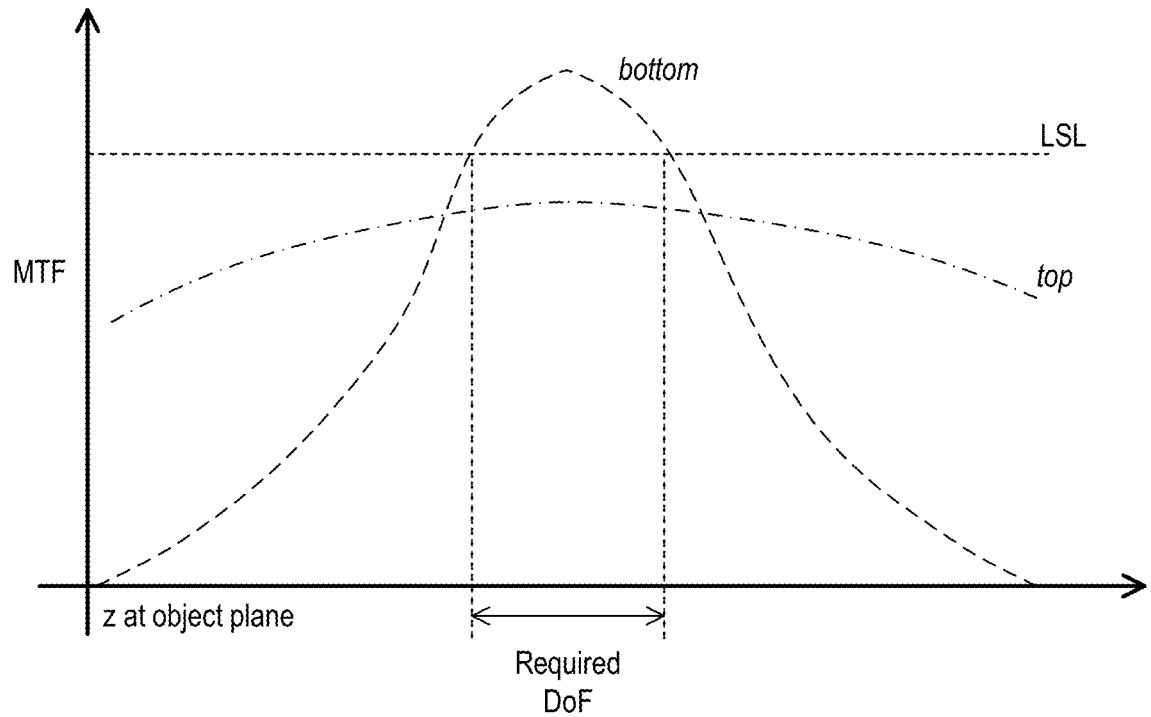
FIG. 3 is a graph showing the lower specification limit (LSL) for the modulation transfer function (MTF) and depth of field (DoF) requirements for a camera as illustrated in FIG. 2A, according to some embodiments.

FIG. 3 is a graph showing the lower specification limit (LSL) for the modulation transfer function (MTF) and the depth of field (DoF) requirements for a camera as illustrated in FIG. 2A, according to some embodiments. The horizontal axis represents z (distance) at the object plane. The vertical axis represents the MTF. LSL is the lower specification limit for the MTF. The two vertical lines represent the required DoF range. The dashed line curve is the MTF at the closer (bottom) end of the object plane. The dash and dot line curve is the MTF at the farther (top) end of the object plane. As shown in the graph, the closer (bottom) end of the object plane has a narrow or low DoF because of the shorter distance, but has a relatively high MTF. The farther (top) end of the object plane has a large DoF, but low MTF peak (below the LSL) due to distortion.

Figure 4A:
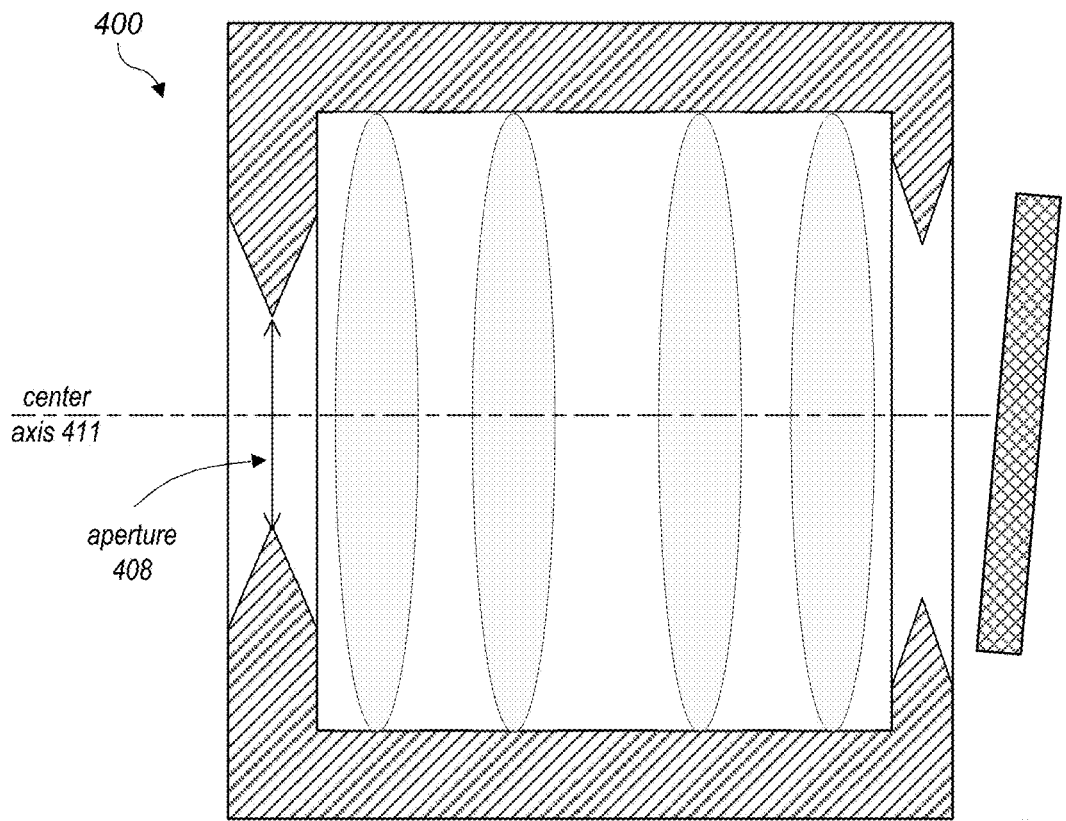
FIG. 4A illustrates increasing the aperture of a camera as illustrated in FIG. 2A, according to some embodiments.

The MTF at the farther (top) end of the object plane may be increased by lowering the f-number of the camera. FIG. 4A illustrates increasing the aperture of a camera as illustrated in FIG. 2A to lower the F-number, according to some embodiments. The f-number N or f # is given by $$N=f/D$$

where f is the focal length, and D is the diameter of the entrance pupil (the effective aperture). The entrance pupil of aperture 408 has been widened when compared to the aperture of the camera in FIG. 2A. This provides a lower f-number for the camera 400.

Figure 4B:
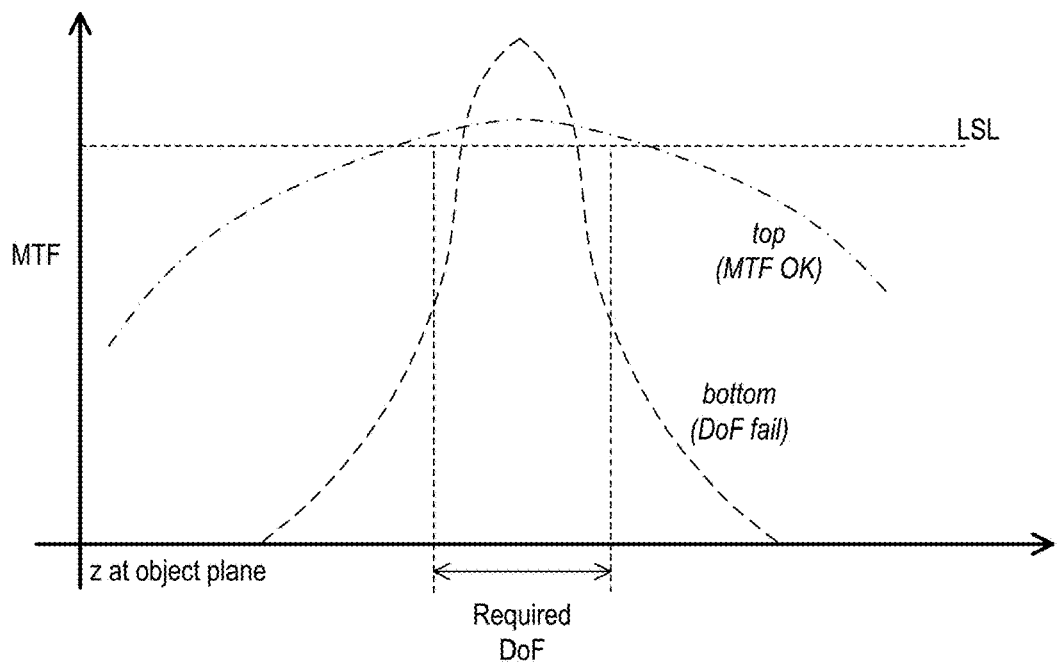
FIG. 4B is a graph illustrating effects on the MTF and DoF caused by increasing the aperture, according to some embodiments.

FIG. 4B is a graph illustrating effects on the MTF and DoF caused by increasing the aperture to lower the f-number, according to some embodiments. As shown in the graph, the lower f-number provides a higher MTF peak at the farther (top) end of the object plane. The DoF and MTF at the farther (top) end of the object plane now satisfy the requirements. However, lowering the f-number narrows the DoF at the closer (bottom) end of the object plane, and the DoF no longer satisfies the requirements.

Figure 5A:
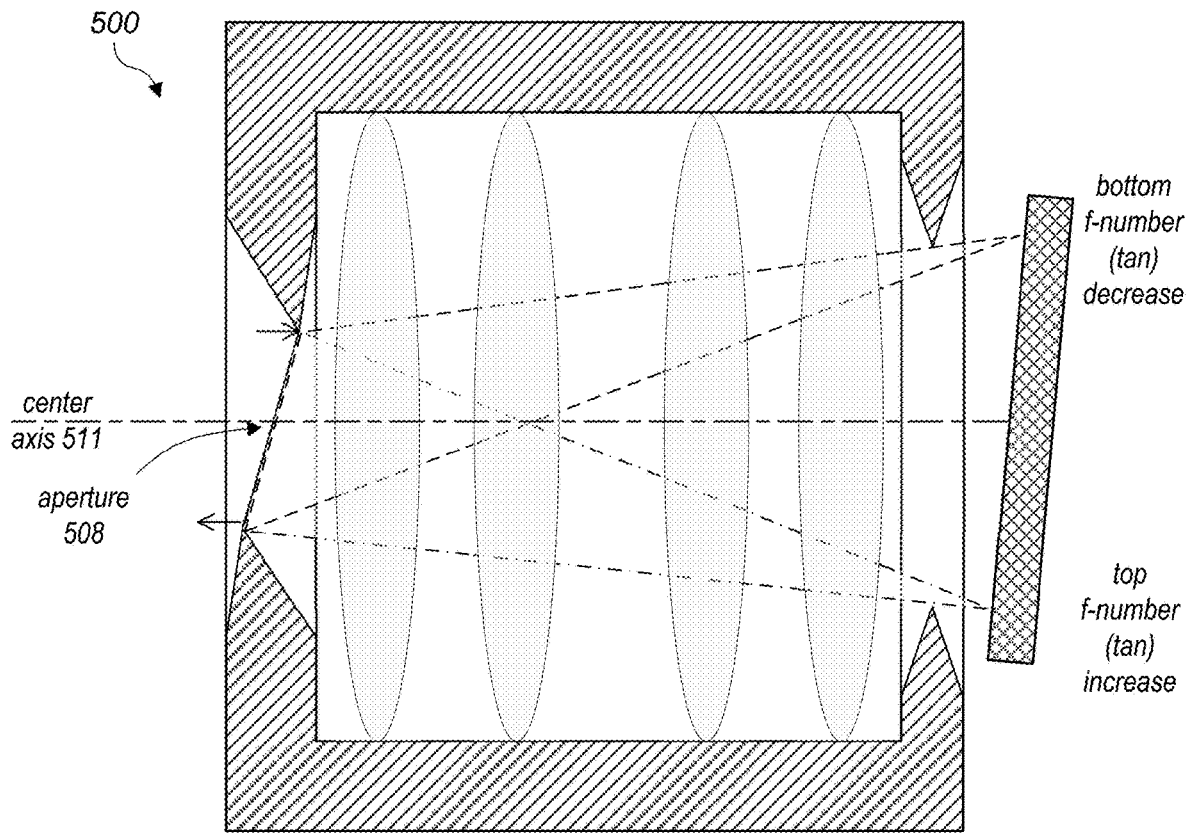
FIG. 5A illustrates tilting the aperture of a camera as illustrated in FIG. 4A, according to some embodiments.

FIG. 5A illustrates tilting the aperture of a camera as illustrated in FIG. 4A, according to some embodiments. Tilting the aperture 508 of the camera 500 provides a wider entrance pupil and increases the f-number for light received from a closer (e.g., bottom) end of the object plane and narrows the entrance pupil and thus decreases the f-number for light received from a farther (e.g., top) end of the object plane.

Figure 5B:
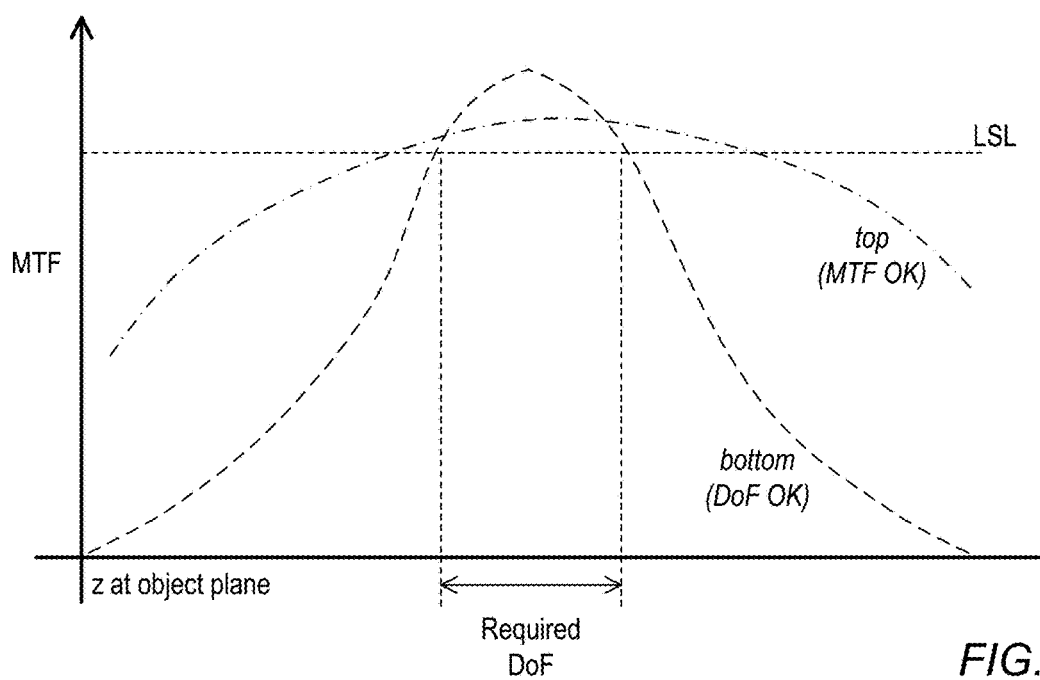
FIG. 5B is a graph illustrating effects on the MTF and DoF caused by tilting the aperture, according to some embodiments.

FIG. 5B is a graph illustrating effects on the MTF and DoF caused by tilting the aperture, according to some embodiments. As shown in the graph, the lower f-number at the farther (top) end of the object plane provides a higher MTF peak at that end of the object plane that satisfies the DoF requirements. Increasing the f-number at the closer (bottom) end of the object plane widens the DoF at that end of the object plane, and the DoF now satisfies the requirements.

In some embodiments, the lens system of the camera may be configured to increase local effective focal length (EFL) and magnification at the farther (e.g., top) end of the object plane, increase pixel density at the end of the image corresponding to the farther end of the object plane, decrease local EFL and magnification at the closer (e.g., bottom) end of the object plane, and increase the depth of field (DoF) at the nearer end (e.g., bottom) of the object plane. In various embodiments, the lens system may be modified using one or more of the following techniques:

tilting one or more lenses or lens groups in the lens system relative to the center axis of the camera and/or relative to other lenses or lens groups in the lens system;
  decentering one or more lenses or lens groups in the lens system relative to the center axis of the camera and/or relative to other lenses or lens groups in the lens system; and
  forming one or more of the lenses in a radially asymmetric shape with respect to the center axis of the camera.

Note that these techniques may, but do not necessarily, result in asymmetric air gaps between lenses or lens groups. Thus, in various embodiments, the lens system may consist of:

radially symmetric lenses with at least one lens tilted with respect to another lens and an asymmetric air gap between at least two of the lenses;
  radially symmetric lenses with at least one lens decentered with respect to another lens and an asymmetric air gap between at least two of the lenses;
  at least one radially asymmetric lens with symmetrical air gaps between the lenses; at least one radially asymmetric lens and an asymmetric air gap between at least two of the lenses; or
  more generally, various combinations of normal lenses (i.e., radially symmetric lenses perpendicular to the center axis), tilted lenses, decentered lenses, and/or radially asymmetric lenses with symmetric and/or asymmetric air gaps between the lenses.

Note that radially asymmetric lenses may be tilted or decentered in some embodiments. Different ones of these techniques may have different advantages and disadvantages when compared to the other techniques. For example, using radially asymmetric lenses to provide asymmetric local EFL and magnification at the ends of the object plane may provide more control of EFL and magnification across the object plane than does tilting or decentering radially symmetric lenses. However, radially asymmetric lenses may be more difficult and expensive to design and manufacture than radially symmetric lenses.

Whichever of the methods described above are used to modify the lens system, the lens barrel may be modified to accommodate the modified lenses. Note that the lens barrel may be radially symmetrical, or may have an arbitrary shape.

Figure 6A:
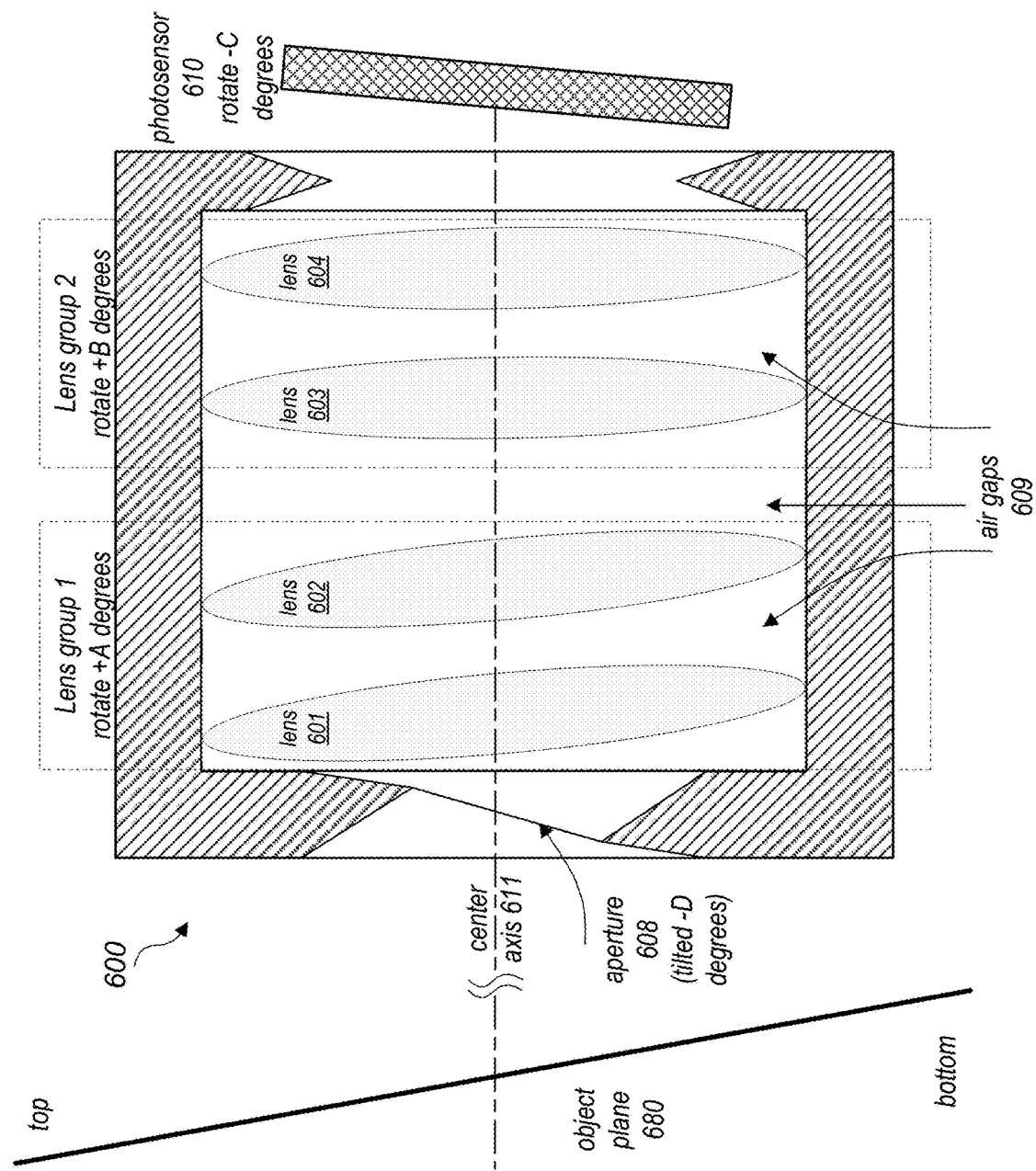
FIG. 6A illustrates tilting one or more lenses or lens groups of a camera as illustrated in FIG. 5A, according to some embodiments.

FIG. 6A illustrates tilting one or more lenses or lens groups of a camera as illustrated in FIG. 5A, according to some embodiments. FIG. 6A shows an object plane 680 at some distance from the camera 600 that is tilted with respect to the camera 600. In some embodiments, one or more lenses or lens groups in the lens system may be tilted with respect to the center axis 611 of the camera 600 (and thus with respect to the aperture 608, photosensor 610, and other lenses or lens groups) to increase local effective focal length (EFL) and magnification at the farther (e.g., top) end of the object plane 680 and to decrease local EFL and magnification at the closer (e.g., bottom) end of the object plane 680. Note that tilting one lens or lens group creates an asymmetric air gap 609 between that lens or lens group and another lens or lens group. Increasing local EFL and magnification at the farther end of the object plane 680 increases pixel density at the end of the image corresponding to the farther end of the object plane 680 and helps compensate for the keystone effect. Decreasing local EFL and magnification at the closer end of the object plane 680 increases the f-number for light received from the closer end of the object plane 680 and thus widens DoF at the closer end of the object plane 680. In some embodiments, instead of or in addition to tilting a lens or lens group, one or more of the lenses may be formed in a radially asymmetric shape, or one or more of the lenses or lens groups may be decentered, to provide a similar effect.

In the example camera 600 of FIG. 6A, lens group 1 consisting of lenses 601 and 602 has been rotated +A degrees with respect to the center axis 611. Lens group 2 consisting of lenses 603 and 604 has been rotated +B degrees with respect to the center axis 611. The tilting of the two lens groups creates an asymmetric air gap between the lens groups. Photosensor 610 has been rotate −C degrees with respect to the center axis 611. Aperture 608 has been tilted −D degrees.

Figure 6B:
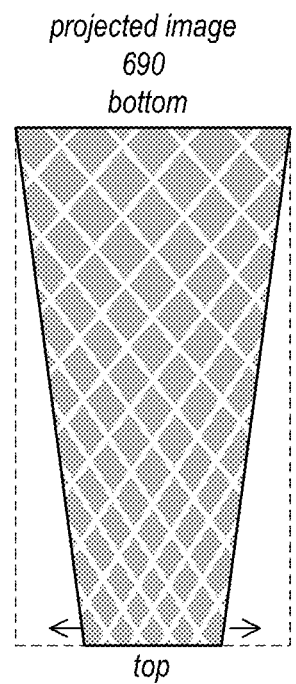
FIG. 6B illustrates effects on the projected image caused by tilting one or more lenses or lens groups, according to some embodiments.

FIG. 6B illustrates effects on the projected image caused by tilting one or more lenses or lens groups, according to some embodiments. Increasing local EFL and magnification at the farther end of the object plane 680 by tilting one or more lens groups (or by providing a radially asymmetric lens or lenses or decentering one or more of the lenses or lens groups) increases pixel density at the end of the image 690 corresponding to the farther end of the object plane 680 and helps compensate for the keystone effect, widening the image 690 of the object plane at the end corresponding to the farther (top) end of the object plane 680.

Figure 6C:
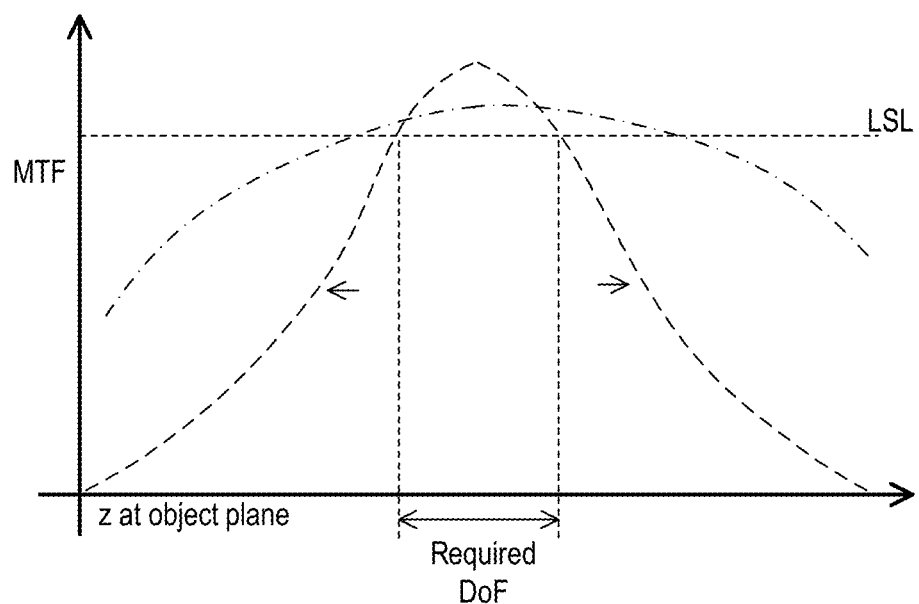
FIG. 6C is a graph illustrating effects on the MTF and DoF caused by tilting one or more lenses or lens groups, according to some embodiments.

FIG. 6C is a graph illustrating effects on the MTF and DoF caused by tilting one or more lenses or lens groups, according to some embodiments. Decreasing local EFL and magnification at the closer end of the object plane 680 by tilting one or more lens groups (or by providing a radially asymmetric lens or lenses or decentering one or more of the lenses or lens groups) increases the f-number for light received from the closer end of the object plane 680 and thus widens DoF at the closer end of the object plane 680.

Figure 7:
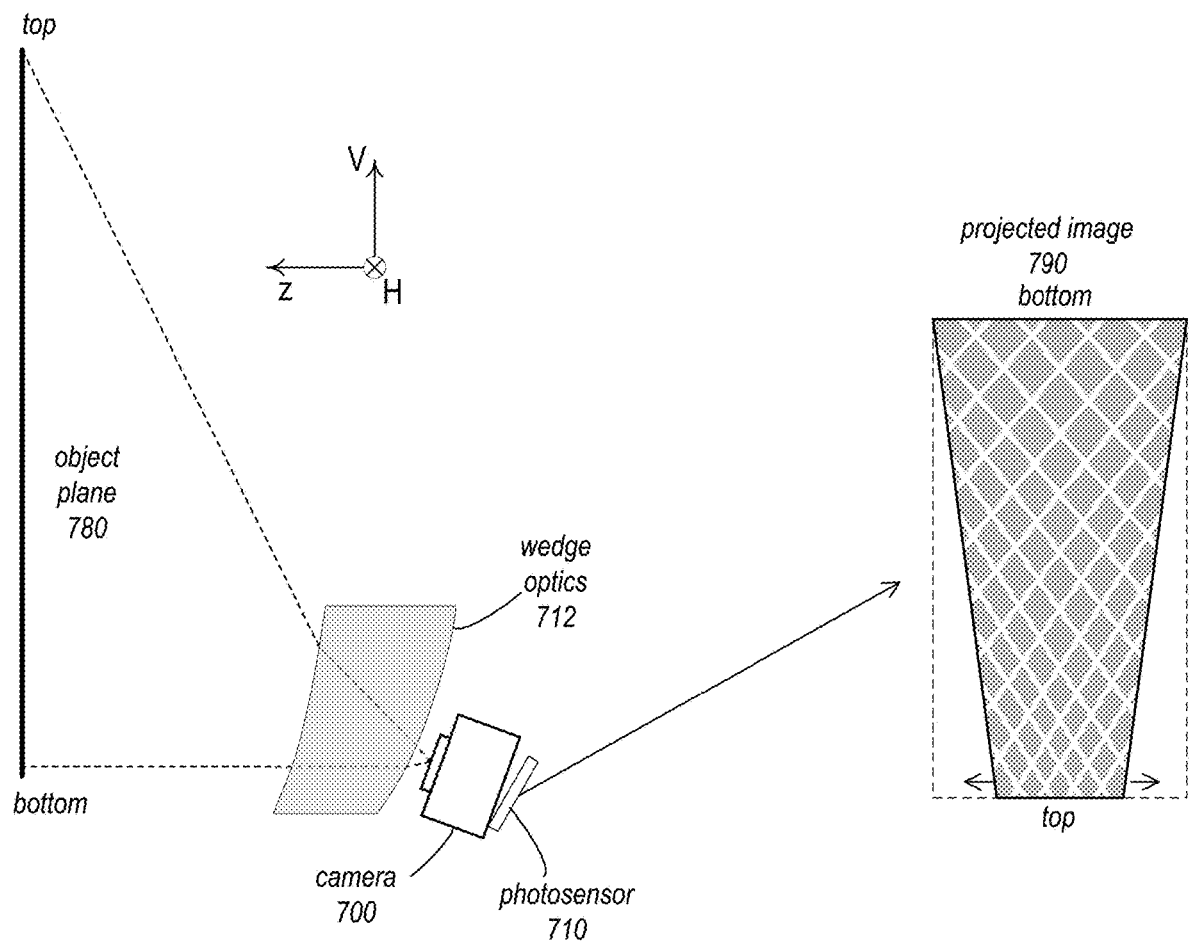
FIG. 7 illustrates wedge optics used with a camera as illustrated in any of FIG. 2A, 4A, 5A, or 6A, according to some embodiments.

FIG. 7 illustrates wedge optics used with a camera as illustrated in any of FIG. 2A, 4A, 5A, or 6A, according to some embodiments. In some embodiments, the imaging system may include "wedge" optics 712, an optical element located in front of the camera 700 aperture, between the camera 700 and the object plane 780, which affects light received from the object plane 780 that passes through the wedge optics 712 to the aperture. The wedge optics 712 may affect light received from the closer (e.g., bottom) end of the object plane 780 differently than light received from the farther (e.g., top) end of the object plane 780. The wedge optics 712 may, but does not necessarily, help to correct for one or more of keystone distortion, resolution non-uniformity, and/or gradient blur. In some embodiments, the wedge optics 712 may ease constraints on the other components of the imaging system, for example by lessening the degree of tilt needed at one or more of the elements.

Figure 8:
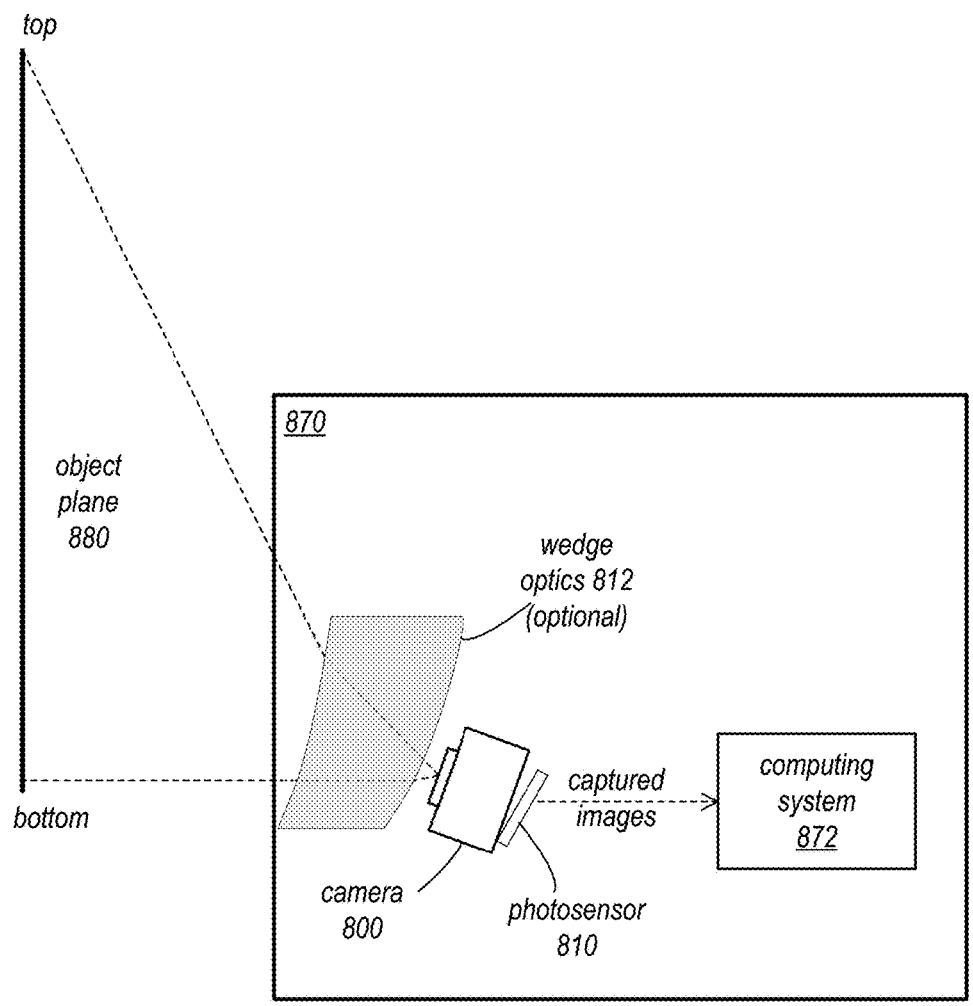
FIG. 8 illustrates an imaging system including a camera as illustrated in any of FIG. 2A, 4A, 5A, 6A, or 7, according to some embodiments.

FIG. 8 illustrates an imaging system including a camera 800 as illustrated in any of FIG. 2A, 4A, 5A, 6A, or 7, according to some embodiments. The camera 800 may be a still camera or a video camera. The photosensor 810 may be a visible light sensor that captures light within a range of the visible spectrum or an infrared (IR) or near-infrared (NIR) sensor. In some embodiments, the camera 800 may be fixed in a location in or on an object or surface 870 to capture images of objects in front of the camera 800 (i.e., within the camera 800's field of view). The object or surface 870 may be fixed (e.g., a building or wall), or alternatively may be mobile (e.g., a vehicle). A surface (object plane 880) of an object in the field of view of the camera 800 may be tilted with respect to the camera 800. In other words, one end of the object (e.g., the bottom) may be closer to the camera 800 than the other end of the object (e.g., the bottom). An image of the object captured by the camera 800 may thus exhibit keystone distortion, resolution non-uniformity, and/or gradient blur. To compensate for these effects, one or more of the components of the camera 800 (e.g., the aperture, lenses or lens groups, and photosensor 810) may be tilted with respect to each other and/or with respect to a center axis of the camera 800. In some embodiments, the imaging system may include "wedge" optics 812 located in front of the camera 800 aperture, between the camera 800 and the object plane 880, which affects light received from the object plane 880 that passes through the wedge optics 812 to the aperture.

Figure 10:
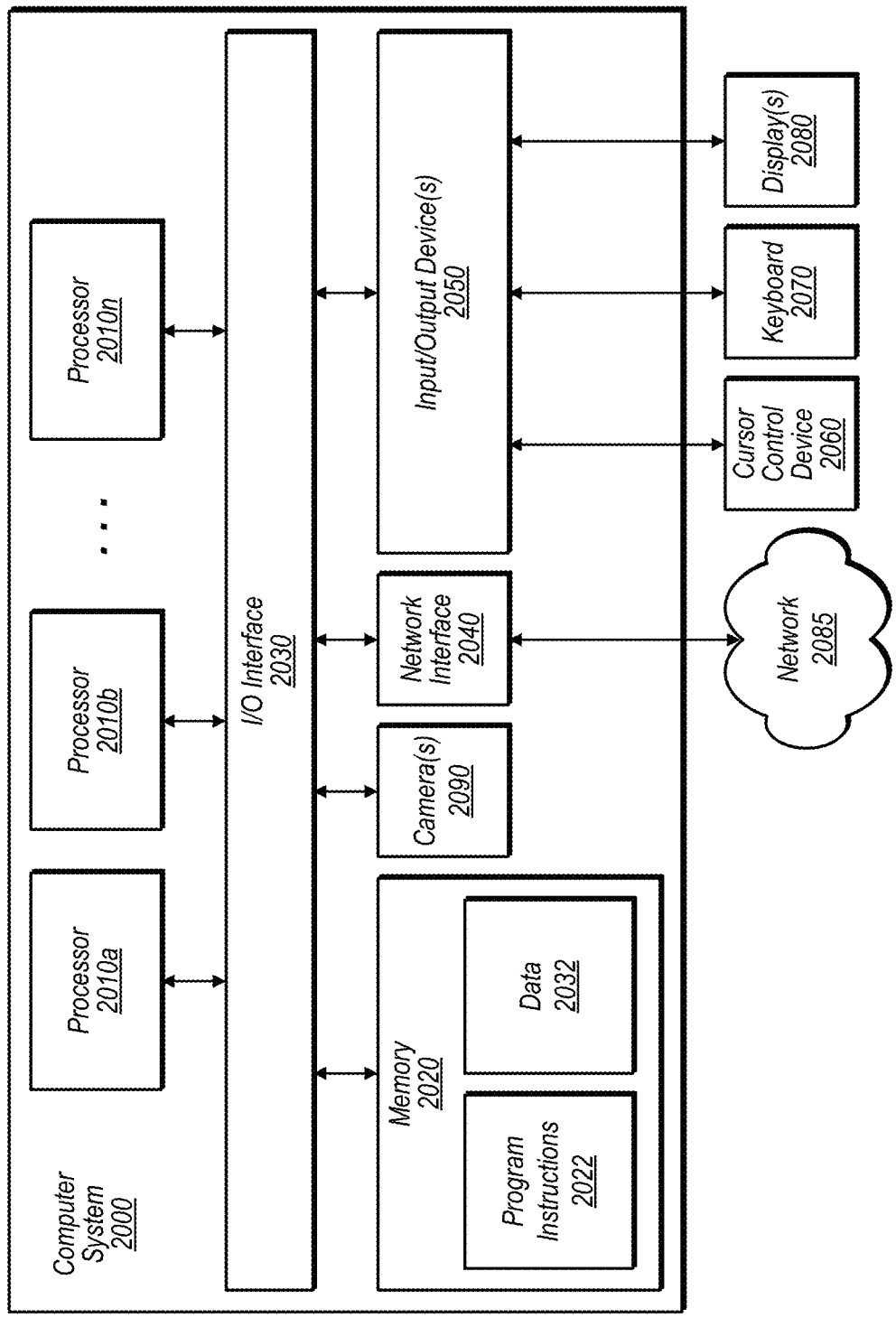
FIG. 10 illustrates an example computer system that may be used in embodiments.

In some embodiments, the camera 800 may be integrated with or coupled to (via a wired and/or wireless connection) a computing system 872, for example a computing device as illustrated in FIG. 10, that includes hardware, code, and data for processing still or video images captured by the camera 800. As a non-limiting example, the camera 800 may be used to capture visible light or IR images in position sensing or range finding systems, and the computing system 872 may include hardware and/or software for processing the images to provide position sensing or range finding functionality for an object (e.g., a vehicle) in which the camera 800 and computing system 872 are integrated. Note that embodiments of the imaging system described herein are not limited to use in position sensing or range finding applications, and may be used in any of a variety of applications in which captured images are processed and/or analyzed to correct for keystone distortion, resolution non-uniformity, and/or gradient blur resulting from tilt of an object plane with respect to the camera 800. While FIG. 8 shows computing system 872 as external to the camera 800, in some embodiments a computing system (e.g., a system on a chip (SoC)) may be integrated in the camera 800.

FIG. 9 is a high-level flowchart of a method for capturing images using a camera as illustrated in any of FIG. 2A, 4A, 5A, 6A, 7, or 8 in which one or more of the components are tilted with respect to each other and/or with respect to a center (or mechanical) axis of the camera, according to some embodiments. As indicated at 1900, light from a tilted object plane is received at an aperture of a camera. In some embodiments, the aperture is enlarged and/or tilted with respect to a center axis of the camera; the enlarged and/or tilted aperture acts to increase the f-number for light received from a closer (e.g., bottom) end of the object plane and decrease the f-number for light received from a farther (e.g., top) end of the object plane, thus increasing the MTF at the farther (e.g., top) end of the object plane.

While not shown in FIG. 9, in some embodiments, light from the object field passes through and is affected by wedge optics located between the aperture and the object plane prior to being received at the aperture. The wedge optics may affect light received from the closer (e.g., bottom) end of the object plane differently than light received from the farther (e.g., top) end of the object plane. The wedge optics may, but does not necessarily, help to correct for one or more of keystone distortion, resolution non-uniformity, and/or gradient blur. In some embodiments, the wedge optics may ease constraints on the other components of the imaging system, for example by lessening the degree of tilt needed at one or more of the elements As indicated at 1910, light from the object plane that passes through the aperture is refracted by a lens system. In some embodiments, one or more lenses or lens groups of the lens system are tilted with respect to an center axis of the camera and/or with respect to each other to increase local EFL and magnification for the farther (e.g., top) end of the object plane and to decrease local EFL and magnification for the closer (e.g., bottom) end of the object plane. Note that tilting one lens or lens group creates an asymmetric air gap between that lens or lens group and another lens or lens group. In some embodiments, instead of or in addition to tilting a lens or lens group, one or more of the lenses may be formed in a radially asymmetric shape to provide a similar effect.

As indicated at 1920, light refracted by the lens system forms an image at an image plane proximate to the surface of a photosensor. In some embodiments, the photosensor is tilted to compensate for tilt of the image plane and thus correct for gradient blur. As indicated at 1930, an image is captured by the photosensor.

While not shown in FIG. 9, in some embodiments, the camera may include an infrared (IR) filter to reduce or eliminate interference of environmental noise on the photosensor. The IR filter may, for example, be located between the lens stack and the photosensor. In some embodiments, the camera is a fixed-focus camera. However, in some embodiments, the camera may include autofocus technology.

In some embodiments, the camera referred to in FIG. 9 may be configured as illustrated in any of FIG. 2A, 4A, 5A, 6A, 7, or 8. However, note that variations on the examples given in the Figures are possible while achieving similar optical results.

Example Computing Device

FIG. 10 illustrates an example computing device, referred to as computer system 2000, that may include or be coupled to embodiments of a camera as illustrated in FIGS. 2A through 9. In addition, computer system 2000 may implement methods for controlling operations of the camera and/or for performing image processing of images captured with the camera and/or other functions using images captured with the camera. In different embodiments, computer system 2000 may be any of various types of devices, including, but not limited to, an embedded system, a System on a Chip (SoC), a personal computer, desktop computer, laptop, notebook, tablet or pad device, slate, or netbook computer, mainframe computer, handheld computer, workstation, network computer, mobile device, wireless phone, smartphone, consumer device, video game console, handheld video game device, application server, television, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include or be coupled to one or more cameras 2090, for example one or more cameras as described above with respect to FIGS. 2A through 9, which may also be coupled to I/O interface 2030, or one or more cameras as described above with respect to FIGS. 2A through 9 along with one or more other cameras such as conventional video or still cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of a camera 2090 and for processing images captured with a camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support a camera 2090, including but not limited to image processing software and interface software for controlling camera 2090. In some embodiments, images captured by a camera 2090 may be stored to memory 2020. In addition, metadata for images captured by a camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a photosensor that captures light projected onto a surface of the photosensor;
a front aperture; and
a lens system comprising two or more refractive lens elements that refracts light received through the aperture from an object located in a field of view of the camera to form an image of the object at an image plane, wherein the camera is positioned with respect to the object such that one end of the object is closer to the camera than an opposite end of the object;
wherein the aperture is tilted with respect to a center axis of the camera to provide a wider entrance pupil and higher f-number for light received from the end of the object that is closer to the camera and to provide a narrower entrance pupil and lower f-number for light received from the end of the object that is farther from the camera; and wherein the photosensor is rotated with respect to the center axis of the camera to compensate for tilt of the image plane so that the image of the object is substantially focused at all object heights.

2. The camera as recited in claim 1, wherein at least one of the refractive lens elements is tilted with respect to at least one other refractive lens element to increase local effective focal length (EFL) and magnification for light received through the aperture from the end of the object that is farther from the camera and to decrease local EFL and magnification for light received through the aperture from the end of the object that is closer to the camera.

3. The camera as recited in claim 1, wherein at least one of the refractive lens elements is radially asymmetric with respect to the center axis of the camera to increase local effective focal length (EFL) and magnification for light received through the aperture from the end of the object that is farther from the camera and to decrease local EFL and magnification for light received through the aperture from the end of the object that is closer to the camera.

4. The camera as recited in claim 1, wherein at least one of the refractive lens elements is decentered with respect to the center axis of the camera to increase local effective focal length (EFL) and magnification for light received through the aperture from the end of the object that is farther from the camera and to decrease local EFL and magnification for light received through the aperture from the end of the object that is closer to the camera.

5. The camera as recited in claim 1, further comprising an optical element located in front of the aperture that affects light received from the object prior to the light passing through the aperture, wherein the optical element affects light received from the end of the object that is closer to the camera differently than light received from the end of the object that is farther from the camera.

6. The camera as recited in claim 1, wherein the camera is in a fixed position on a particular object or surface to capture images of the object or of another object within the camera's field of view.

7. An optical system, comprising:
a front aperture; and
a lens system comprising two or more refractive lens elements that refracts light received through the aperture from an object to form an image of the object at an image plane, wherein the optical system is positioned with respect to the object such that one end of the object is closer to the optical system than an opposite end of the object;
wherein the aperture is tilted with respect to a center axis of the optical system to provide a wider entrance pupil and higher f-number for light received from the end of the object that is closer to the optical system and to provide a narrower entrance pupil and lower f-number for light received from the end of the object that is farther from the optical system.

8. The optical system as recited in claim 7, wherein at least one of the refractive lens elements is tilted with respect to at least one other refractive lens element to increase local effective focal length (EFL) and magnification for light received through the aperture from the end of the object that is farther from the optical system and to decrease local EFL and magnification for light received through the aperture from the end of the object that is closer to the optical system.

9. The optical system as recited in claim 7, wherein at least one of the refractive lens elements is radially asymmetric with respect to the center axis of the optical system to increase local effective focal length (EFL) and magnification for light received through the aperture from the end of the object that is farther from the optical system and to decrease local EFL and magnification for light received through the aperture from the end of the object that is closer to the optical system.

10. The optical system as recited in claim 7, wherein at least one of the refractive lens elements is decentered with respect to the center axis of the optical system to increase local effective focal length (EFL) and magnification for light received through the aperture from the end of the object that is farther from the optical system and to decrease local EFL and magnification for light received through the aperture from the end of the object that is closer to the optical system.

11. The optical system as recited in claim 7, further comprising an optical element located in front of the aperture that affects light received from the object prior to the light passing through the aperture, wherein the optical element affects light received from the end of the object that is closer to the optical system differently than light received from the end of the object that is farther from the optical system.

12. The optical system as recited in claim 7, wherein the optical system is in a fixed position on a surface to capture images of the object or another object within the optical system's field of view.

13. A device, comprising:
one or more processors;
a memory comprising program instructions executable by at least one of the one or more processors to receive and process images of an object plane captured by a camera; and
the camera, comprising:
a photosensor that captures light projected onto a surface of the photosensor;
a front aperture; and
a lens system comprising two or more refractive lens elements that refracts light received through the aperture from an object located in a field of view of the camera to form an image of the object at an image plane,
wherein the camera is positioned with respect to the object such that one end of the object is closer to the camera than an opposite end of the object, and
wherein the aperture is tilted with respect to a center axis of the camera to provide a wider entrance pupil and higher f-number for light received from the end of the object that is closer to the camera and to provide a narrower entrance pupil and lower f-number for light received from the end of the object that is farther from the camera.

14. The device as recited in claim 13, wherein at least one of the refractive lens elements is tilted with respect to at least one other refractive lens element to increase local effective focal length (EFL) and magnification for light received through the aperture from the end of the object that is farther from the camera and to decrease local EFL and magnification for light received through the aperture from the end of the object that is closer to the camera.

15. The device as recited in claim 13, wherein at least one of the refractive lens elements is radially asymmetric with respect to the center axis of the camera to increase local effective focal length (EFL) and magnification for light received through the aperture from the end of the object that is farther from the camera and to decrease local EFL and magnification for light received through the aperture from the end of the object that is closer to the camera.

16. The device as recited in claim 13, wherein at least one of the refractive lens elements is decentered with respect to the center axis of the camera to increase local effective focal length (EFL) and magnification for light received through the aperture from the end of the object that is farther from the camera and to decrease local EFL and magnification for light received through the aperture from the end of the object that is closer to the camera.

17. The device as recited in claim 13, further comprising an optical element located in front of the aperture that affects light received from the object prior to the light passing through the aperture, wherein the optical element affects light received from the end of the object that is closer to the camera differently than light received from the end of the object that is farther from the camera.

18. The device as recited in claim 13, wherein the camera is in a fixed position on a surface to capture images of the object or another object within the camera's field of view.

19. The device as recited in claim 13, wherein the photosensor is rotated with respect to the center axis of the camera to compensate for tilt of the image plane.

20. The device as recited in claim 13, wherein the camera further comprises an infrared (IR) filter to be located between the lens system and the photosensor to reduce interference of environmental noise on the photosensor.

\* \* \* \* \*